July 20, 1926.
O. M. COBLE
PLOW
Filed May 29, 1925
1,592,843
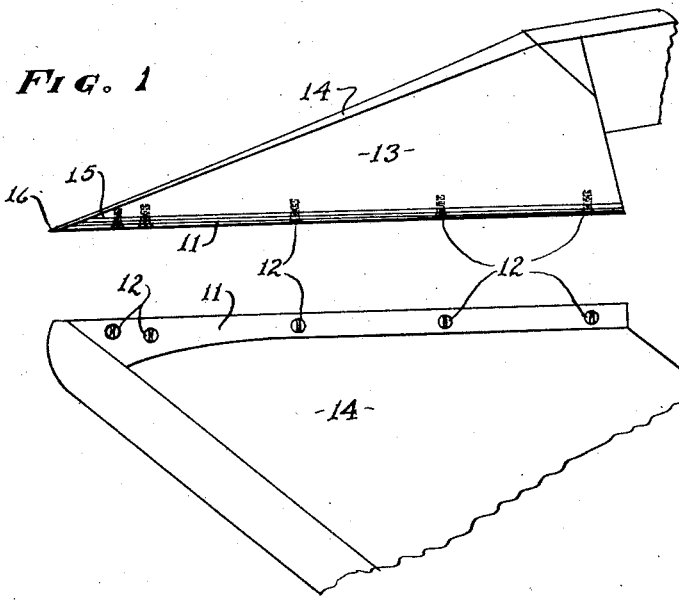
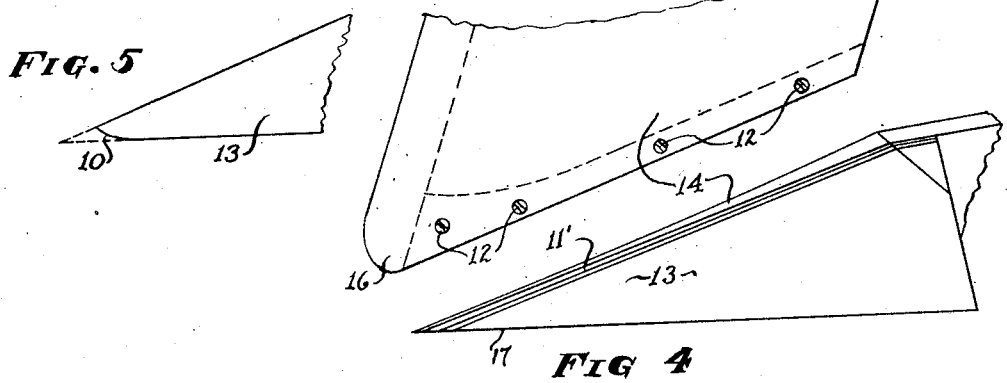
INVENTOR.
Otis M. Coble
BY
William Edwards Jr.
ATTORNEY.

Patented July 20, 1926.

1,592,843

UNITED STATES PATENT OFFICE.

OTIS M. COBLE, OF SEDGWICK, KANSAS.

PLOW.

Application filed May 29, 1925. Serial No. 33,691.

The invention relates to an improvement for plows. Farmers and others are quite familiar with the fact that the point of a plowshare soon becomes dull and worn so that the point rounds upwardly. The point must be heated and sharpened in order to keep it in the ground and so that it will properly do its work. By means of my invention I compensate for this wear and tendency to round off at the point, by the employment of shims, the removal of which as will be later disclosed causing the worn point of the plowshare to approximately adjust itself to the desired position with respect to the several allied features in combination in plows and whereby proper plowing may be accomplished.

In the drawings; Fig. 1 is a view showing the land side of the plow and the plow share.

Fig. 2 is a bottom view of Fig. 1.

Fig. 3 is a top view of Fig. 4. Fig. 4 showing an alternate arrangement of shims to that disclosed in Fig. 1, the view showing the land side of the plow and the plowshare.

Fig. 5 is a view of the land side of a plow showing how under normal conditions, wear occurs to dull the point of the plowshare.

Similar numerals of reference indicate corresponding parts throughout all the figures of the drawings.

Referring to the drawings, at 10 in Fig. 5 the dotted triangle represents the worn away portion of a plow point after considerable use. Under ordinary conditions, the plowshare would be taken to the blacksmith for resharpening. By means of my invention this can be avoided, saving time and money. The plowshare 14 is of the type used with moldboard plows and the like, the portion 13 represents the land side of the plow combination. Shim members comprising strips of steel plate fashioned substantially in the shape illustrated in the plan view Fig. 2 are secured by means of bolts or screws to the under edge portion of the land side member 13. In Fig. 1 a plurality of these shims 11 are shown arranged and projecting beyond the point 15 of the land side member 13 and the operative edge portion 16 of the plow share covers the outermost point of the allied shims 11.

Now under plowing conditions, the wear at 10 will operate to eventually remove the corner 16 of the plowshare and the base shim member as shown in Fig. 1 would be rounded up similar to that curve at 10, as shown in Fig. 5. When this occurs, I then remove the screws 12 and take off the bottom shim 11, rescrew the remaining shims in place, and the new point 16 of the plowshare caused by prior wear then aligns with the new base shim element and for all practical purposes the plow will operate as well as if the point 16 of a rounded plowshare had been heated and sharpened. Further shim removal will follow of course, as further wear occurs.

Figs. 3 and 4 show modifications of the invention; shims 11' of proper shape are inserted intermediate the land side 13 of the plow and the under side of the plow share as illustrated. When the point 16 is worn, a shim 11' is removed thus dropping the new point of the share down to line with the base 17 of the land side of the plow element.

Such modifications may be employed as lie within the scope of the appended claims.

Having fully described my invention what I now claim as new and desire to secure by Letters Patent is:

1. A plow element having a land side member, a plurality of horizontally disposed layers of shim elements detachably affixed to the under side of said land member.

2. A plow element having a land side member, a plurality of layers of shim elements arranged in different planes one above the other with their outermost points arranged in a receding series.

In testimony whereof I hereunto affix my signature.

OTIS M. COBLE.